United States Patent [19]

Foret

[11] Patent Number: 4,657,795
[45] Date of Patent: Apr. 14, 1987

[54] TUBULAR MATERIAL BASED ON A FABRIC-REINFORCED RESIN, AND A BICYCLE OR SIMILAR VEHICLE FRAME CONSTRUCTED WITH SUCH A MATERIAL

[75] Inventor: Régis Foret, Brindas, France

[73] Assignee: Technique du Verre Tissé S.A., Lyons, France

[21] Appl. No.: 772,202

[22] Filed: Sep. 5, 1985

Related U.S. Application Data

[63] Continuation of Ser. No. 611,210, May 17, 1984, abandoned.

[30] Foreign Application Priority Data

May 24, 1983 [FR] France ................................. 83 08764

[51] Int. Cl.$^4$ .......................... B32B 5/22; B32B 1/08; B63B 15/00
[52] U.S. Cl. ................................. 428/36; 87/9; 138/153; 138/172; 138/DIG. 2; 138/DIG. 3; 280/281 R; 428/298
[58] Field of Search .................. 428/36, 113, 298; 280/281 R; 87/9; 188/153, 172, DIG. 2, DIG. 3, DIG. 7

[56] References Cited

U.S. PATENT DOCUMENTS

| 2,747,616 | 5/1956 | De Ganahl | 138/55 |
| 4,171,626 | 10/1979 | Yates et al. | 64/15 |
| 4,320,160 | 3/1982 | Nishimura et al. | 428/107 |

FOREIGN PATENT DOCUMENTS 2455980 5/1980 France .
2501579 9/1982 France .
8220436 12/1982 France .

Primary Examiner—John E. Kittle
Attorney, Agent, or Firm—Parkhurst & Oliff

[57] ABSTRACT

A tubular material based on a fabric reinforced resin, said material comprising layed up fabric layers, the inside and outside layers consisting of bidirectional braided sheaths, said latter two layers sandwiching an intermediate, unidirectional braid consisting primarily of parallel, longitudinal yarns at least 10% of which have a high tensile strength and the remainder of which are yarns of the same type as the yarns of said bidirectional braids. An application in the construction of a bicycle frame is described.

21 Claims, 4 Drawing Figures

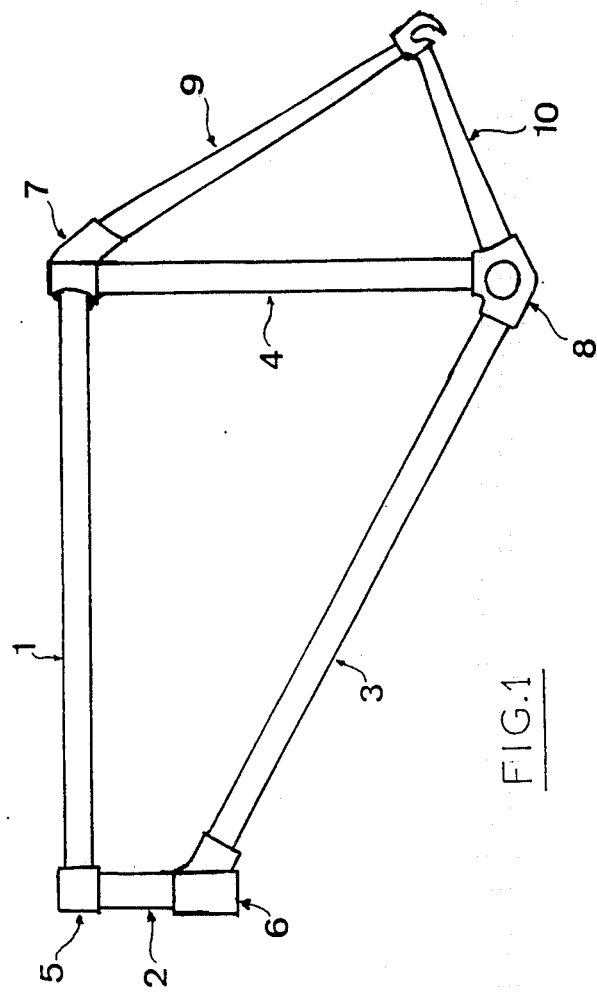

TUBULAR MATERIAL BASED ON A FABRIC-REINFORCED RESIN, AND A BICYCLE OR SIMILAR VEHICLE FRAME CONSTRUCTED WITH SUCH A MATERIAL

This is a continuation of application Ser. No. 611,210 filed May 17, 1984, now abandoned.

This invention concerns an improvement to the construction of bicycle frames or similar vehicle frames and in particular a new type of tubular material, based on a fabric reinforced resin, suitable for fabricating such frames.

Bicycle frames basically consist of tubular members connected together in a specific configuration which, combined with the nature of the material used, must reconcile inherently contradictory characteristics such as maximum lightness, outstanding stiffness and a certain resilience, ie. an ability to quickly absorb the elastic strains imposed on said frames by the stresses to which they are subjected.

Until now, bicycle frames have mainly been constructed with metal tubes, for example steel tubes. Such frames are generally heavy and prone to damage from external agents such as rust.

To overcome these disadvantages, special alloys have been tried which unfortunately are very expensive.

Similarly, frames of molded thermoplastic have been proposed, which, although they solve the problems of rust and cost, also result in a heavy, insufficiently stiff frame.

Another structural material known in the prior art is a laminated tubular material, ie. a material consisting of layers of fabric sheets impregnated with a suitable resin which, following a treatment such as polymerisation, allows the different layers to be bonded together, yielding a strong and stiff structure. Tubular structures of this type are described in particular in French patent applications Nos. 79/12 533, 81/05 261 and 82/20 436 by same applicant.

Such structures, used specifically in making sailboat masts, rely for fabric reinforcement on braided fabrics made for example from glass, silica or carbon yarn, or from various chemical fibers such as those marketed under the Kevlar brand name.

A variety of braids have been proposed in the prior art to suit the mechanical characteristics required for each given laminated tube product. Thus, certain braids, termed "bidirectional" have been proposed. These braids are made from two criss-crossed sets of (preferably identical) yarns, arranged in a pattern according to the generatrix of the sheath formed by said braid, the yarns generally being skewed with respect to one another, prior to fabrication of the laminate proper, at an angle of about 45°.

Such a braid is characterized by an ability to deform in both its longituindal and lateral directions and thus to easily take on a shape other than a cylindrical one.

Otherwise, for certain applications, especially those where an improvement mainly in bending strength, rather than in torsional strength, is required, so-called "unidirectional" sheaths have been used as the fabric reinforcement item, meaning sheaths consisting mainly of longitudinal yarns arranged parallel to each other. Preferably, these longitudinal yarns are positioned and kept in place by means of much finer braided filaments, said latter filaments forming only a small part of the whole. In general the linking filaments are glass filaments—the same as routinely used in making laminated materials. Such unidirectional sheaths however have the major disadvantage of being only moderately deformable in the radial direction, making them ill-suited for use in making tapered tubes.

Bicycle frames could conceivably be made with such laminated tubular materials except that in such an application, it appeared difficult to reconcile the requirements of light weight, high impact strength and, especially, of high bursting strength. In fact, although the fabrication of advantageously lightweight laminated tubular items containing carbon fiber-based braids could be envisaged, it was observed that the frame thus constructed had a low torsional strength and, above all, involved a risk of bursting or splintering dangerous for the user.

It was then found however, and this is the object of the invention, that it was indeed possible to make a bicycle frame simultaneously meeting the requirements of lightness, strength and resilience associated with such products, based on laminated tubular materials reinforced with braided fabric sheathing, provided that the braids used have a specified structure and be layed up from the inside to the outside of said tubular member in a well-defined manner.

Basically, the invention provides a new tubular material for a frame according to the invention made up of a plurality of superimposed layers of fabric, the innermost and outermost layers thereof being bidirectional braided sheaths sandwiching at least one third layer of longitudinal yarns, wherein:

said inside and outside bidirectional braids are based on high-strength fibers such as glass fibers, carbon fibers or Boron fibers;

said unidirectional middle layer consists of at least one ribbon of parallel longitudinal yarns, at least 10% of said latter yarns being yarns with a high tensile strength, such as, for example, those yarns marketed under the Kevlar name, having a high modulus of elasticity, and the other longitudinal yarns being preferably of the same type as those making up the bidirectional braids of the inside and outside layers.

Preferably, in one embodiment of the invention, the longitudinal yarns of the middle layer are linked together by means of a braid of thinner yarns relative thereto, said braid being only a small part of the whole material.

Moreover, in a preferred embodiment, the outside layer is covered with an additional bidirectional braid of glass yarns serving as a finish layer.

If, in another preferred embodiment, said inside and outside layers may consist of a single bidirectional braid, then said just-mentioned layers must be made by superimposing several bidirectional braids of the same type of yarn, such that the skewing of said yarns differs from one braid to the next, but is generally in the 30° to 55° range. In a further embodiment of the invention, said inside bidirectional layer consists of two superimposed bidirectional component braids while said outside layer on the other hand consists of three superimposed component braids.

It is possible, based on a material made in any of the above-described fashions, to build bicycle frames which are not only very light, outstandingly stiff and resilient, but also avoid any risk of splintering. It has been found that whereas it is indeed possible to break such a tube, the members thus fractured nevertheless remain tied to one another thanks to the special structure and positioning within said tube of the unidirectional braid.

Another advantage of a material according to the invention is that it makes it possible to make tubes having a non-cylindrical, even a tapering, cross-section as well as a round cross-section. Tapered cross-sections in particular can be obtained by the procedure disclosed in French Pat. No. 82/20 436, to make the seat stay and chain stay members typical of a bicycle frame.

The features and advantages of the invention will be more readily understood thanks to the following description of a preferred, but by no means exclusive embodiment of the invention, with reference to the appended drawings in which:

FIG. 1 shows a bicycle frame constructed from a tubular material according to the invention;

Figure 4:
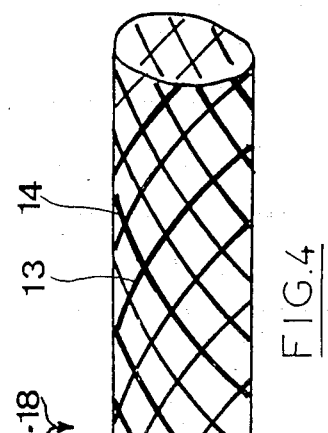
FIGS. 3 and 4 are schematic perspective views showing the structure of the bidirectional and unidirectional braids making up said tubular material.

Referring now to FIG. 1, the bicycle frame according to the invention consists of a crossbar 1, a heat tube 2, a downtube 3, and a seat tube 4, said tubes being connected together through lugs 5, 6, 7 and 8. For better clarity, the fork, handlebar, seat and pedal assembly are not included in the illustration of FIG. 1. Connecting lugs 7 and 8 further support tubular members 9 and 10, ie. the so-called seat stay and chain stay respectively, serving to maintain the bicycle's rear wheel.

Such a frame includes both cylindrical tubular members, ie. tubes 1, 2, 3 and 4, and tapered tubular members, ie. the two stays 9 and 10.

Figure 2:
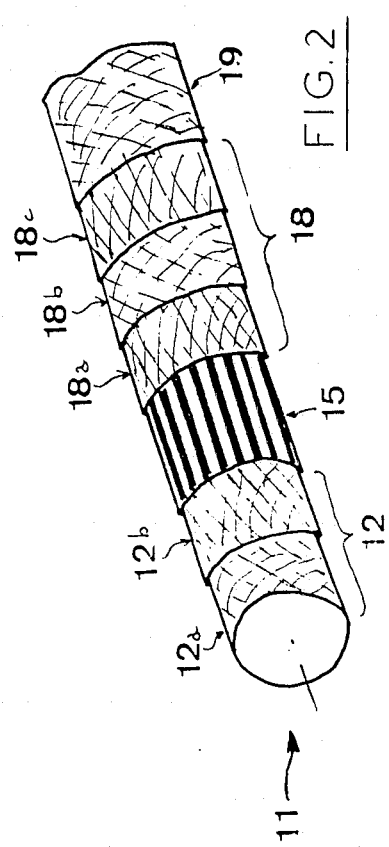
FIG. 2 is an exploded, perspective view schematically illustrating the composition of such a material.

The structure of said primary, cylindrical tubular members 1, 2, 3, 4 is as follows: they are made from a tube as schematically drawn in FIG. 2, laminated in accordance with a procedure similar to that described in French Pat. No. 81/05 261. This method shall not be described herein so as not to complicate the description.

Figure 3:
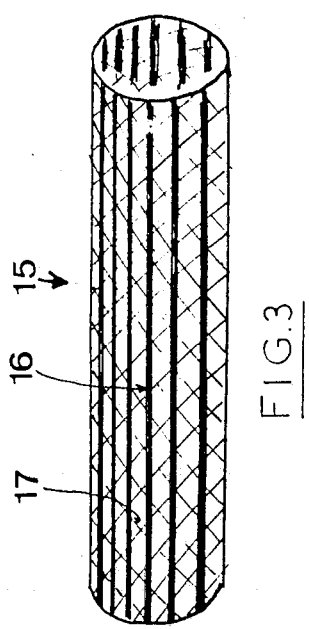

Said material, designated by the overall reference 11, basically consists of a polymerisable resin strengthened by a fabric armoring. Said armoring, in accordance with the invention, comprises from the inside to the outside:

an inside layer 12, consisting in the present case of two superimposed, bidirectional braided sheaths 12a, 12b, with a structure as schematically illustrated in FIG. 4, and including two sets of yarns 13, 14; said yarns 13, 14 being intertwined at an angle of 45° in one of the braids and at an angle of 30° in the other braid; each set of yarns comprising 48 carbon yarns, each with an overall count of 198Tex; braid 12 having a nominal diameter of 27 mm on leaving the braider;

an intermediate layer 15 as shown in FIG. 3, consisting in the case at hand of parallel yarns 16 linked together by means of linking yarns 17, said linking yarns being very fine compared with the longitudinal yarns 16 and accounting for only small part of the whole; said longitudinal yarns 16 in accordance with the invention being made from two types of materials, these being carbon fiber yarns comparable to those used in the inside layer 12 on the one hand, and, on the other hand, yarns with a high modulus of elasticity such as those sold under the Kevlar brand, said latter Kevlar yarns accounting for 10% of the weight of said braid 15; a total of 264 longitudinal yarns being used in the present case, in a proportion of 240 carbon yarns with a 198Tex count for every 24 Kevlar yarns with a 126Tex count;

an outside layer 18, consisting of three superimposed bidirectional braids 18a, 18b, 18c, the yarns therein being skewed at an angle of 30°, 45° and 55° respectively in each of the braids, and said braids also consisting of carbon yarns similar to those used in the two braids of the inside layer 12;

and a finishing layer 19 consisting, as the inside and outside layers 12 and 18, of a bidirectional braid, said latter braid however, unlike that of the former layers, consisting of glass yarns with a 136Tex count in the case under consideration.

The structure of said previously-mentioned stay bars 9 and 10 is laminated and tubular, like that of the primary members, except that the unidirectional intermediate braid 15 is tied together by means of stretchable yarns in a manner comparable to that applied for the product described in French patent application No. 82/20 436 by same applicant, enabling a tapered configuration to be given to said members. Compared with a like frame made of light metal, say Duraluminum, the material according to the invention provide a weight gain of 20%. In addition, the mechanical strength and resilience of the new frame are far better.

Finally, compared with a like frame made exclusively with carbon fiber reinforced fabric—ie. fibers known for producing very strong, lightweight products—the material according to the invention provides a frame of nearly the same weight, having a good resilience and eliminating any risk of bursting or splintering from a violent impact.

Although the invention has been associated throughout this description with the manufacture of bicycle frames, this preferred embodiment should not be construed as limiting the scope of the invention. In fact, the tubular material according to the invention could also be used in other similar applications, namely, for example, in making motorcycle frames.

Accordingly, the invention is not limited to the example of implementation described hereinbefore but also covers all other embodiments made within the same spirit. Thus a different number of bidirectional component braids might be used for the inside and outside layers, such that only a single braid could be used in each of said layers. Similarly, although the longitudinal yarns of the intermediate layer are preferably linked by yarns which are much thinner than said longitudinal yarns, it is conceivable to eliminate this link altogether. It is furthermore conceivable that the inside layer might comprise several sets of superimposed longitudinal yarns. Lastly, the tubes made from this material may have a non-circular cross section, such as for example a sectional i.e., polygonal shape.

What is claimed is:

1. A tubular material comprising a plurality of superimposed layers of fabric, said plurality of superimposed layers including an inside layer, an intermediate layer and an outside layer, said inside layer and said outside layer comprising bidirectional braided sheets, said inside layer and said outside layer comprising a material selected from the group consisting of glass fibers, carbon fibers and boron fibers, said intermediate layer comprising at least one layer of parallel, high-strength longitudinal yarns, at least 10% of said longitudinal yarns being high tensile strength yarns having a higher tensile strength than the remaining longitudinal yarns, said high tensile strength yarns comprising aramid fibers.

2. A tubular material based on a fabric-reinforced resin, said material comprising a plurality of superimposed layers of fabric, the inside layer and outside layer of said material comprising bidirectional braided sheaths, said inside and outside layers sandwiching at least one intermediate layer of longitudinal yarns, wherein:

said inside layer and said outside layer comprise bidirectional braids comprising high-strength fibers, and said unidirectional intermediate layer comprises at least one layer of parallel, high-strength longitudinal yarns, at least 10% of said longitudinal yarns being high tensile strength yarns having a higher tensile strength than the remaining longitudinal yarns, said high tensile strength yarns comprising aramid.

3. A tubular material as in claim 2, wherein the remaining longitudinal yarns are of the same type as the fibers making up the bidirectional braids of said inside and outside layers, said longitudinal yarns being linked together by means of a braid of comparatively finer linking yarns than the longitudinal yarns.

4. A material as in claim 2, wherein said outside layer is covered by a bidirectional braid of glass fibers.

5. A material as in claim 3, wherein said inside layer and said outside layer consist of a single bidirectional braid.

6. A material as in claim 3, wherein said inside and outside layers are made by laying up several bidirectional braids.

7. A material as in claim 6, wherein the yarns are differently skewed from one component braid to the next, said skewing being preferably at an angle ranging from 30° to 55°.

8. A material as in claim 3, being of cylindrical shape.

9. A material as in claim 3, having a tapered shape, said linking yarns being high-stretch yarns.

10. The tubular material of claim 2, wherein said higher strength fibers comprise materials selected from the group consisting of glass fibers, carbon fibers and boron fibers.

11. In a bicycle or similar vehicle frame comprising a number of interconnected tubular members, the improvement comprising:

said tubular members comprising a tubular material based on a fabric-reinforced resin, said material comprising a plurality of superimposed layers of fabric, the inside layer and outside layer of said material comprising bidirectional braided sheaths, said inside and outside layers sandwiching at least one intermediate layer of longitudinal yarns;

said inside layer and said outside layer comprising bidirectional braids based on high-strength fibers, and said unidirectional intermediate layer comprising at least one layer of parallel, high-strength longitudinal yarns, at least 10% of said longitudinal yarns being high tensile strength yarns having a higher tensile strength than the remaining longitudinal yarns, whereby in the event of rupturing said inside and outside layers, said tubular material will not separate into two portions, said high tensile strength yarns comprising aramid.

12. A frame as in claim 11, wherein the remaining longitudinal yarns are of the same type as the fibers making up the bidirectional braids of said inside and oustide layers, said longitudinal yarns being linked together by means of a braid of comparatively finer linking yarns than the longitudinal yarns.

13. A frame as in claim 11, wherein said outside layer is covered by a bidirectional braid of glass fibers.

14. A frame as in claim 12, wherein said inside layer and outside layer consist of a single bidirectional braid.

15. A frame as in claim 12, wherein said inside and outside layers are made by laying up several bidirectional braids.

16. A frame as in claim 15, wherein the yarns are differently skewed from one component braid to the next, said skewing being preferably at an angle ranging from 30° to 55°.

17. A frame as in claim 11, said interconnectd tubular members comprising a crossbar, a head tube, a downtube and a seat tube.

18. A frame as in claim 17, said crossbar, head tube, downtube and seat tube having a cylindrical shape.

19. A frame as in claim 18, said interconnected tubular members further comprising a seat stay and a chain stay.

20. A frame as in claim 19, said seat stay and said chain stay having a tapered shape, the linking yarns of the unidirectional intermediate braid in said seat stay and said chain stay being high-stretch yarns.

21. The tubular material of claim 11, wherein said higher strength fibers comprise materials selected from the group consisting of glass fibers, carbon fibers and boron fibers.

* * * * *